No. 852,310. PATENTED APR. 30, 1907.
J. WIECHMANN.
CHANGEABLE DRIVE GEAR.
APPLICATION FILED JUNE 13, 1906.

WITNESSES
Edw. Thorpe

INVENTOR
John Wiechmann
BY Munn & Co
ATTORNEYS

UNITED STATES PATENT OFFICE.

JOHN WIECHMANN, OF ALBANY, NEW YORK.

CHANGEABLE DRIVE-GEAR.

No. 852,310.  Specification of Letters Patent.  Patented April 30, 1907.

Application filed June 13, 1906. Serial No. 321,534.

*To all whom it may concern:*

Be it known that I, JOHN WIECHMANN, a citizen of the United States, and a resident of Albany, in the county of Albany and State of New York, have invented a new and Improved Changeable Drive-Gear, of which the following is a full, clear, and exact description.

The invention relates to the transmission of power, and its object is to provide a new and improved changeable drive gear, arranged to insure an easy yet powerful transmission of power from one shaft to another, and to allow convenient and quick change of speed and reversal of the motion without danger and shock to the connected parts.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
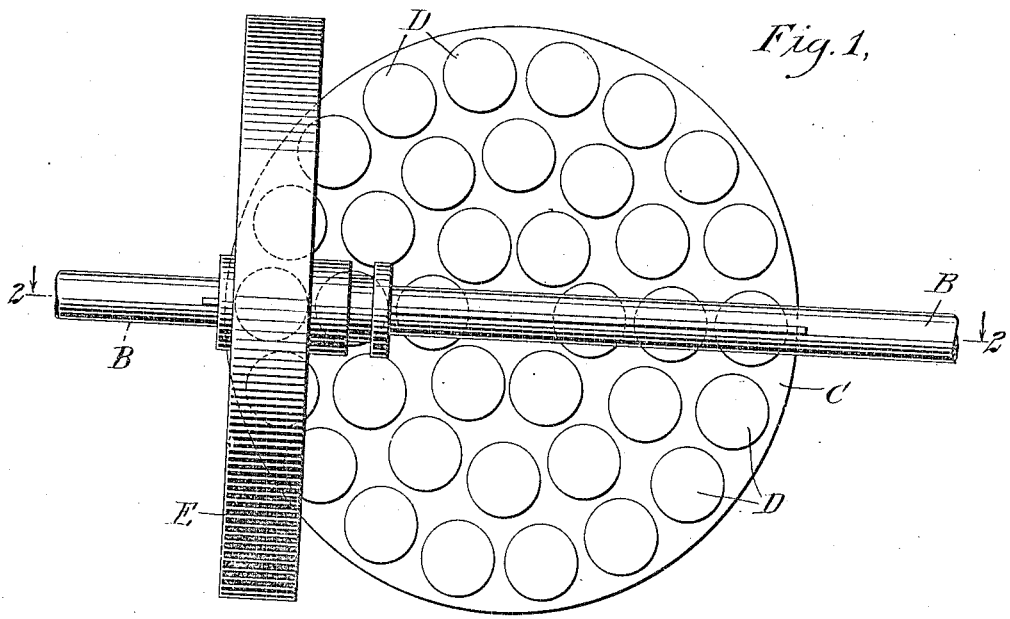
Figure 2:
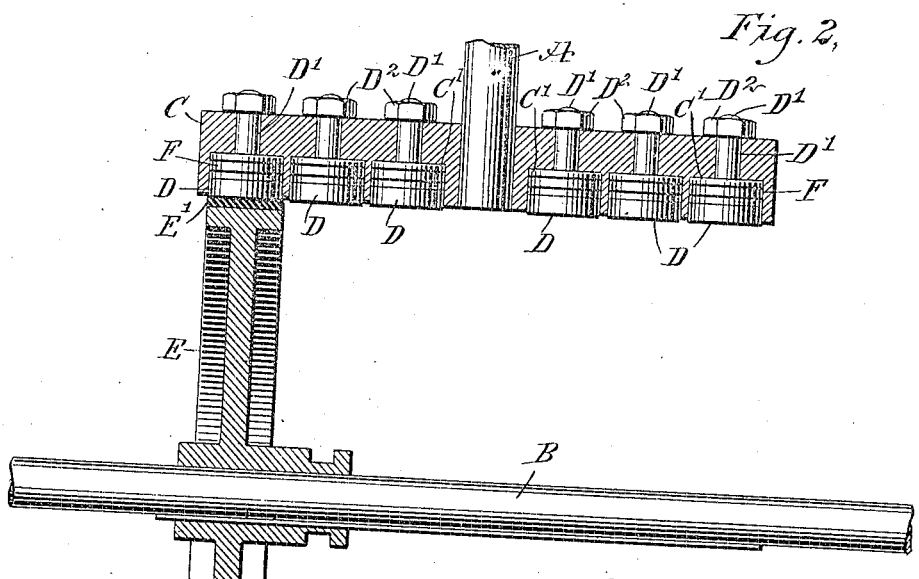
Figure 3:
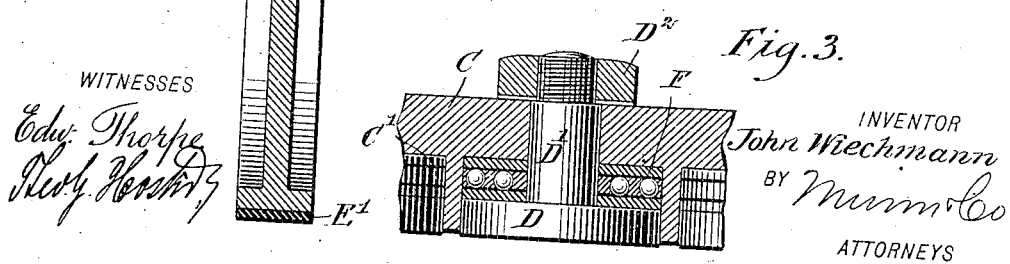

Figure 1 is an inverted plan view of the improvement; Fig. 2 is a sectional side elevation of the same on the line 2—2 of Fig. 1, and Fig. 3 is an enlarged sectional side elevation of part of the driving wheel, showing more particularly the mounting of the revoluble disks.

Of the shafts A and B illustrated in the drawings, the shaft A is presumed to be the driving shaft while the shaft B is the driven shaft, and on the driving shaft A is secured a wheel C provided in its face with concentric circular rows of revoluble disks D adapted to be engaged by the peripheral face of a wheel E mounted to turn with and to slide on the driven shaft B in the direction of the length thereof by the use of a suitable shifting fork or a like shifting device under the control of an operator.

Each of the disks D is set in a recess C' in the face of the driving wheel C, and the outer face of each disk D is preferably raised above the face of the wheel C, and between the inner or rear face of the disk D and the back wall of the recess C' is interposed a ball bearing F to insure an easy rotation of the disk D in the recess C' whenever the disk D is in driving engagement with the peripheral surface of the driven wheel E.

Each disk D is provided with a stem D' mounted to turn in the wheel C, and on the upper outer end of the stem D' screws a nut D² to hold the disk D and its ball bearing F in proper position within the corresponding recess C'.

The peripheral face of the driven wheel E is preferably provided with a covering E' of felt, rubber or other suitable material.

Now, when the shaft A and the wheel C are rotated, it is evident that the frictional contact between the corresponding row of disks D with the peripheral face of the wheel E causes a rotation of the latter and consequently of the shaft B, it being, however, understood that the speed with which the shaft B is driven from the shaft A depends on the position of the driven wheel E relative to the row of disks D with which the wheel is in engagement at the time. Thus when the wheel E is moved farther inward on the face of the wheel C the shaft B is driven at a lower rate of speed than that given to the shaft A, and the speed of the shaft B can be increased by shifting the wheel E farther outward relative to the driving wheel C. In changing the speed the wheel E is disengaged from one row of disks and moved into position to be engaged by another row of disks that will give the desired speed.

It will also be noticed that by engaging the wheel E with the disks D on one side of the axis of the wheel C a rotary motion is given to the shaft B in one direction, and when the wheel E is shifted to the opposite side of the axis of the wheel C then the motion of the shaft B is reversed. Thus, by shifting the wheel E lengthwise on its shaft B any desired speed can be given to the shaft B, and the motion thereof can be reversed whenever it is desired to do so.

Now, by the arrangement described, the disks D of the row in driving engagement at the time with the wheel E rotate when coming in contact with the peripheral surface of the wheel E, so that all binding action between the disks and the wheel E is prevented, and at the same time a powerful transmission of the power takes place from the shaft A to the shaft B. The disks D rotate freely owing to the interposition of the ball bearings F above described and illustrated in the drawings, and the disks in each circular row are set close together to practically form a continuous surface for engagement by the peripheral face of the wheel E.

Having thus described my invention, I claim as new and desire to secure by Letters Patent:

1. A gear, comprising a pair of friction wheels, of which one is provided in its face with revoluble disks adapted to be engaged by the peripheral face of the other friction wheel.

2. A changeable gear, comprising a pair of friction wheels, of which one is provided in its face with concentric rows of revoluble disks adapted to be engaged by the peripheral face of the other friction wheel.

3. A changeable gear, comprising a pair of friction wheels, of which one is provided in its face with concentric rows of revoluble disks adapted to be engaged by the peripheral face of the other friction wheel, and ball bearings for the said disks in their friction wheel.

In testimony whereof I have signed my name to this specification in the presence of two subscribing witnesses.

JOHN WIECHMANN.

Witnesses:
    JOHN THOMSON,
    JOHN A. McGINTY.